Aug. 9, 1932.  H. L. PROUT  1,870,421
SYSTEM OF FRICTION GEARING
Filed April 27, 1931   3 Sheets-Sheet 1

Inventor
HERBERT L. PROUT
Atty. L A Paley

Aug. 9, 1932.      H. L. PROUT      1,870,421
SYSTEM OF FRICTION GEARING
Filed April 27, 1931      3 Sheets-Sheet 2

Inventor
HERBERT L. PROUT
Atty. LAPaley

Aug. 9, 1932.  H. L. PROUT  1,870,421
SYSTEM OF FRICTION GEARING
Filed April 27, 1931  3 Sheets-Sheet 3

Inventor
HERBERT L. PROUT
Atty.

Patented Aug. 9, 1932

1,870,421

UNITED STATES PATENT OFFICE

HERBERT L. PROUT, OF VILLA PARK, ILLINOIS

SYSTEM OF FRICTION GEARING

Application filed April 27, 1931. Serial No. 533,201.

This invention relates to speed reducing or speed increasing mechanism, by means of friction wheels properly disposed.

The object of the invention is to provide a simple and inexpensive mechanism for the transmission of power, capable of operating smoothly and silently at a high rate of speed, yet with the possibility of slippage under heavy loads absolutely prevented.

Another object of the invention is to provide a mechanism of the nature described in which the pressure between the friction wheels will be automatically maintained, in proportion to the power being transmitted, so that when running under a light load, the pressure will be light, and the resulting wear and tear reduced to a minimum; such wear and tear as does occur being automatically compensated by the construction of the machine.

Figure 1:
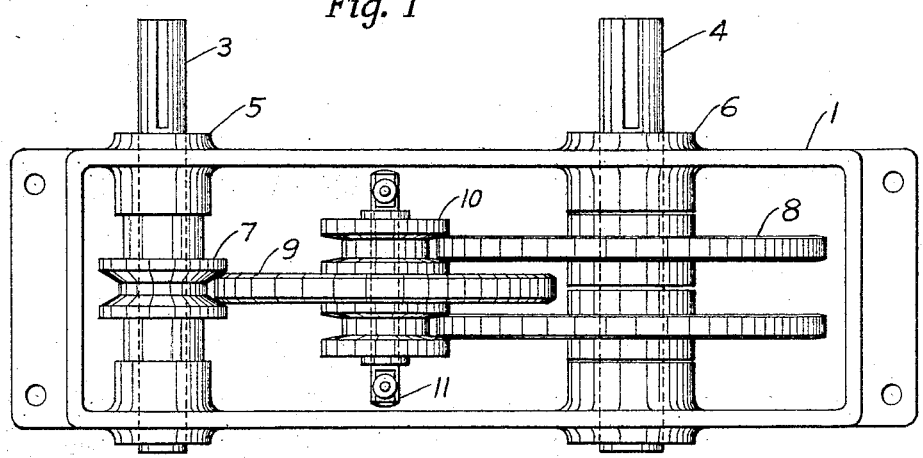
Figure 2:
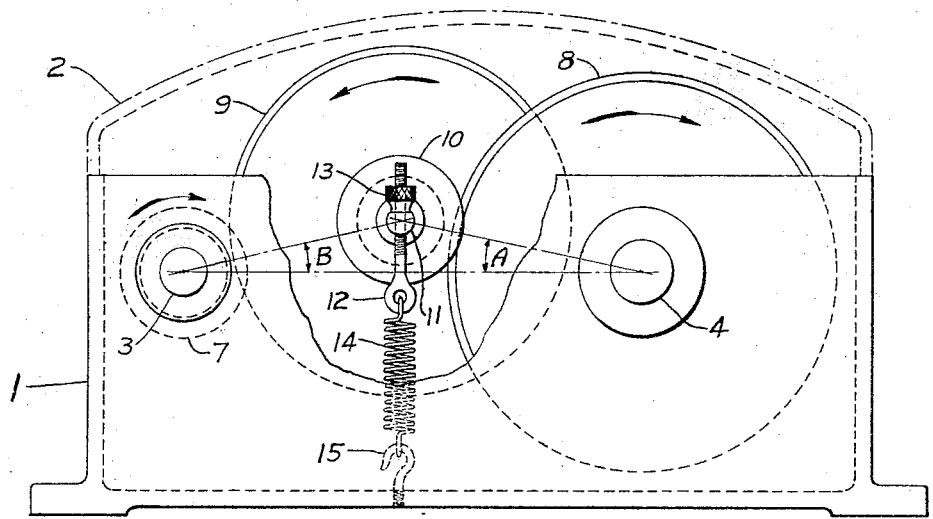
Figure 3:
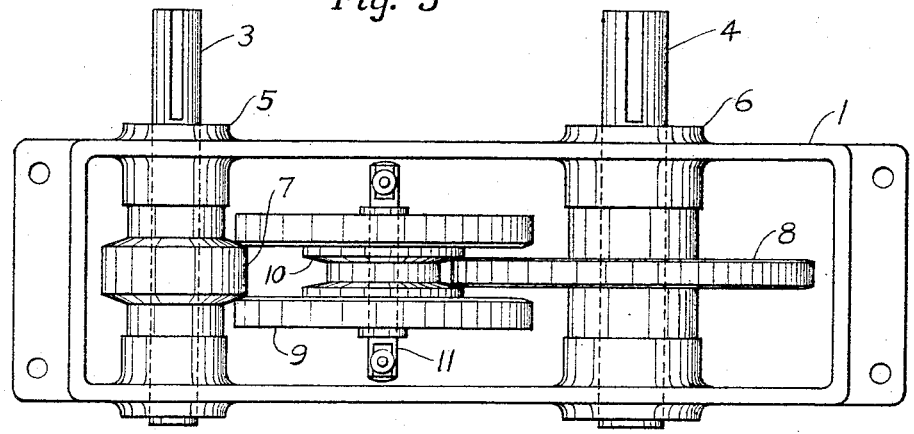
Figure 4:
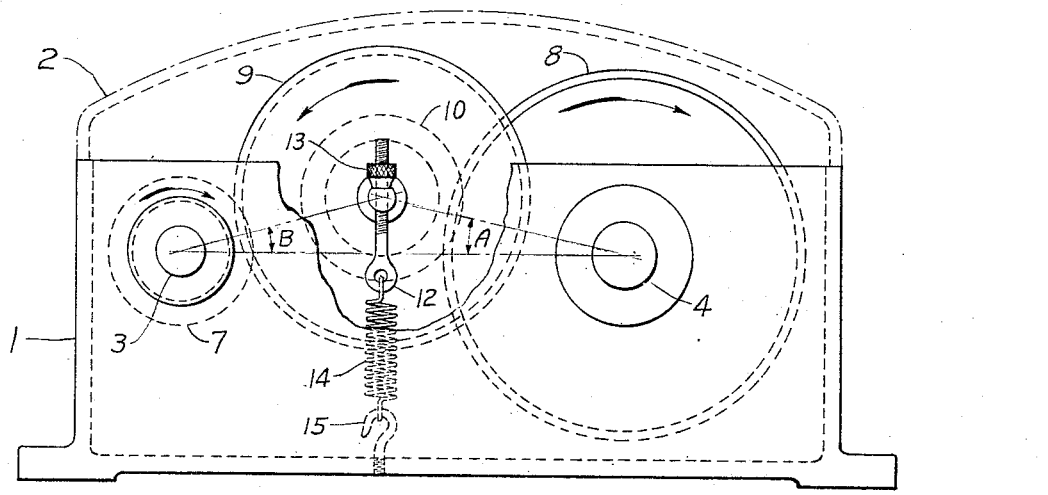
Figure 5:
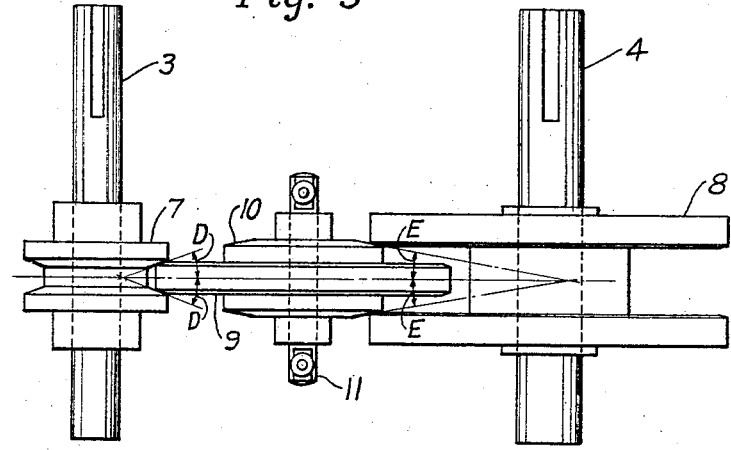
Figure 6:
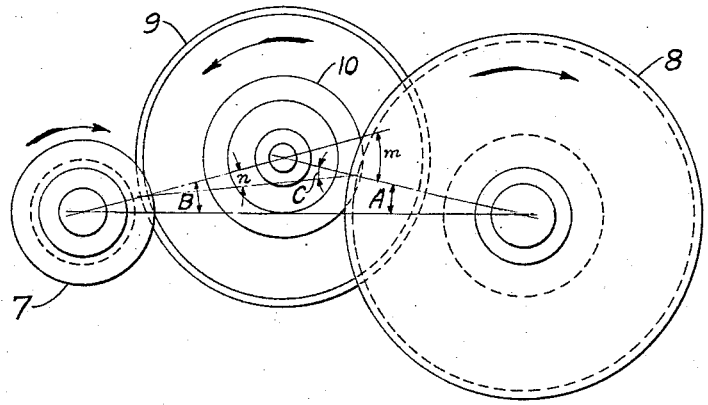

Reference is to be had to the accompanying drawings forming a part of this specification, in which Fig. 1 is a plan view illustrating one form of my invention, Fig. 2 is an elevation of same with a part of the case broken away to disclose the inward construction, and with the cover shown in dot and dash lines, Figs. 3 and 4, similarly represent a plan and elevation respectively of another form of the same invention, Fig. 5, shows still another form in plan view, and Fig. 6 is a diagrammatic view of same in elevation.

This application is a continuation in part of my application Serial No. 444,732, filed April 16, 1930.

Referring now particularly to Figs. 1 and 2, a container or case 1, is adapted to receive oil or some other fluid, if desired, for the lubrication or cooling of the various parts. A cover 2 is provided to prevent splashing of the fluid and to protect the moving parts, the cover being secured to the case 1 by bolts or other means. A drive shaft 3, and a driven shaft 4, are rotatably mounted in parallel relation, in the bearings 5 and 6 respectively. These bearings are preferably integrally formed with the side walls of the case 1, and may be fitted with bushings, or with ball or roller bearings. One or both of the bearings 5 and 6 may also be made adjustable if desired, by eccentrics or other means, to vary the distance between shafts 3 and 4.

Friction wheels 7 and 8, having beveled or conical friction surfaces formed adjacent their peripheries, are mounted on the shafts 3 and 4, respectively, and secured thereto by keys or other means. Between the shafts 3 and 4 are mounted the intermediate friction wheels 9 and 10, which may be integrally formed of one piece, or of several pieces rigidly secured together. On the periphery of wheel 9 are formed suitable beveled friction surfaces to engage with wheel 7, and on wheels 10 are formed suitable beveled friction surfaces to engage wheels 8. The diameters of wheels 9 and 10 are such that when inserted between wheels 7 and 8, they are supported solely by their points of contact, in a position as shown in Fig. 2, so that the lines joining the centers of the wheels will form a toggle angle as at A.

Passing loosely through the center of wheels 9 and 10, is the spindle 11, to the outer ends of which are attached eye bolts 12, having thumb nuts 13, for regulating the tension of springs 14, which in turn are attached to the bottom of the case, as by a hook 15.

The underlying principles, and theory of operation of this invention will now be stated as briefly as possible.

In friction gearing of any description the power transmitted will be dependent on first, the coefficient of friction between the contacting elements, and second, the pressure between them. It is evident, therefore, to increase the pressure between friction surfaces without bringing undue strain upon other moving parts is a matter of first importance. Now by arranging the friction surfaces in the form of beveled wheels, or V-grooved wheels, as in the present invention, it can be shown that with a given force pressing the wheels together, the actual contact pressure will be inversely proportional to the sine of the face angle of the beveled wheels. That is, the smaller the face angle, or the sharper the V-groove of the friction wheels, the greater will be the pressure, and consequently, their transmitting power. In the present invention, this principle has been utilized in connection with a toggle action and other principles which will now be set forth.

Referring to Fig. 2, it will be seen that the drive shaft 3, is to be driven in a clockwise direction as indicated by the arrow. This rotary motion of wheel 7, is transferred by friction to wheel 9, causing it to turn in a counter-clockwise direction, and in turn wheels 10 communicate their motion to wheels 8, causing them to turn in a clockwise direction. Thus, the driven shaft 4, is caused to turn in the same direction, as the drive shaft 3, but at a greatly reduced speed, this reduction in speed being caused by the difference in diameter of wheels 7, 9, 10 and 8. Now it will be apparent that the tractive power of wheel 7 exerts a downwardly acting force upon the periphery of wheel 9, and also the resistance to turning offered by wheels 8 creates a downwardly acting force upon the peripheries of wheels 10. Thus, there are two downward forces acting upon the periphery of wheels 9 and 10, with the result that wheels 9 and 10 tend to move bodily downward between wheels 7 and 8. This downward movement, owing to the toggle action of angle A, causes the wheels to be forced into more intimate contact, thus increasing their tractive power. The greater the resistance to turning offered by wheel 8, the greater will be the tractive power developed. It thus becomes possible to so design and apportion the face angles, and the toggle angle of the friction wheels, that they will be capable of transmitting all power applied to them, without slippage, and the pressure between the friction wheels will be in proportion to the power that is being transmitted. It should be noted here that the action of the springs 14 is intended only to secure the initial pressure between the friction wheels. They may be of very light construction, and can be dispensed with entirely if desired, depending only upon the weight of wheels 9 and 10, to hold them in position. However, the springs are desirable for high speed operation to prevent undue vibration.

The different forms of the invention, shown in Figs. 1, 3 and 5 are alike in principle but differ largely in the particular arrangement of the friction wheels. The friction surfaces are arranged in pairs in every case so as to create a balanced condition without end thrust. In Fig. 3, the driving and driven shafts carry friction wheels with external friction surfaces, which engage the internal friction surfaces of the floating wheels, the latter tending to spread apart under the wedging action. In Fig. 5, the driving and driven shafts carry the internal friction surfaces, and the floating wheels have the external friction surfaces. In Fig. 1, the driving shaft carries a pair of internal friction surfaces, and the driven shaft carries two wheels with a pair of external friction surfaces on each. The wheels 8 are capable of a certain amount of independent end play to permit proper seating in the grooves of wheels 10.

Referring now to Figs. 5 and 6, the method for proportioning the various face angles and toggle angles as used in this invention will be given. It will be evident that since wheel 9 is greater in diameter than wheels 10, the actual tangential force to be transmitted by wheels 10 will be greater than that by wheel 9, and that these tangential forces will be inversely proportional to the radii of wheels 9 and 10. Therefore, the contact pressures on the peripheries of wheels 10 must be greater than those on wheel 9. And as it was shown above that the contact pressures will vary according to the face angle of the bevelled wheels, it follows that the face angle E, should be smaller than the face angle D, in the same proportion that wheels 10 are smaller in diameter than wheel 9. That is, if the friction surfaces of wheel 9 be twice as large in diameter as those of wheels 10, then the face angles D, of wheels 9 and 7, should be approximately twice as large as the face angles E, of wheels 10 and 8. It should be noted that the relative diameters of wheels 7 and 8 do not enter into the calculation at all.

In fixing the proper values for the toggle angles A and B, Fig. 6, the determining factor will be the angle C, which is a certain fixed quantity, and dependent in turn on the coefficient of friction, and the size of face angle E. It will be seen from the figure that this angle C is formed by the line joining the points of contact of wheels 10 and 9, and the line joining the centers of wheels 10 and 8. It will also be evident from the laws of geometry that angle C plus angle $n$ equals angle $m$; also angle A plus angle B equals angle $m$; and therefore angle A plus angle B equals angle C plus angle $n$. Now from the law of sines it will be seen that the sine of angle C is to the sine of angle $n$, as the radius of wheel 9 is to the radius of wheel 10. That is, if R equals the radius of wheel 9, and $r$ equals the radius of wheel 10, then $$\frac{\sin C}{\sin n} = \frac{R}{r}$$

and therefore, $$\sin n = \frac{r}{R} \sin C$$

and since for small angles the sines are very nearly proportional to the angles themselves, we may say that angle $n$ equals $r/R$ times angle C, very nearly.
Therefore, $$A+B=C+\frac{r}{R}C$$

very nearly.

The theoretical value of this constant angle C may be stated as follows:—

The safe working coefficient of friction, divided by the sine of the face angle E, equals the tangent of angle C, or, $$\tan C = f / \text{sine } E$$

Suppose for example, a safe working coefficient of friction is found to be 1/13 or .077, and the face angle adopted to be 10°, then $$\tan C = .077/.1736 = .443$$

which corresponds to an angle of approximately 24°. Then, supposing wheel 9 to be twice the diameter of wheel 10, the proper value for angle A plus angle B would be, $$A+B = C+1/2\ C = 24° + 12° \text{ or } 36°.$$

But if wheel 9 should be three times as large as wheel 10, then the proper value for angle A plus angle B would be, $$A+B = C+1/3\ C = 24° + 8° \text{ or } 32°.$$

Should the wheels 9 and 10 be of the same diameter, then angle A plus angle B should simply be made equal to 2C, or 48°. If the above values be adhered to, no slippage can result, however great the load being transmitted.

Returning now to Figs. 1 and 2, I will give a concrete example of the method of determining and proportioning the various angles. Assuming that the face angles of wheels 10 are 10°, and also that wheel 9 is three times the diameter of wheels 10, then the face angles of wheels 9 and 7 should be approximately 3 times 10° or 30°. The size of the toggle angles A and B should be equal to the constant 24° plus ⅓ of 24°, or 32°; that is, the sum of angles A and B should be equal to 32°.

It will be noticed that in Fig. 1, there are four friction surfaces on the wheels 10, but only two friction surfaces on wheel 9. Had there been two friction surfaces on wheels 10, as in Figs. 3 and 5, then the actual contact pressure on wheels 10 would be three times that on wheel 9. But since there are four friction surfaces on wheels 10 (Fig. 1) the actual contact pressure thereon is equal to ½ of three times that on wheel 9, or 1½ times that on wheel 9. Thus, by dividing the load, the contact pressure on wheels 10 is kept from becoming excessive.

Inasmuch as the proper working and performance of this system of friction gearing is largely dependent upon the proper proportioning of the various angles, it has been thought desirable to state the above methods and theory somewhat in detail.

The actual speed reduction obtained with the wheels proportioned as shown in Fig. 1 is about 10 to 1, although this ratio may of course be varied at will.

The same mechanism may be used as a speed increaser by making shaft 4 the drive shaft, and shaft 3 the driven shaft, and reversing the direction of rotation.

It will be understood that the number of friction surfaces may be increased, if desired, as by cutting more V-grooves in wheels 7 and 10, and by increasing the number of bevel wheels 9 and 8.

While I have illustrated three general forms of this speed reducing mechanism, it will be understood that there are various other ways of arranging the friction surfaces yet coming within the scope of the claims as hereinafter set forth.

What I therefore claim and desire to secure by Letters Patent is the following:

1. A system of friction gearing comprising a drive shaft, a driven shaft in parallel relation thereto, friction wheels having beveled friction surfaces mounted thereon, said friction wheels on said drive shaft being of different diameter than friction wheels on said driven shaft, intermediate friction wheels having beveled friction surfaces of different diameters and face angles for engaging friction wheels on said driving and driven shafts, said intermediate friction wheels being floatably mounted above and between said driving and driven friction wheels and driven in such a direction as to be drawn into closer contact with said wheels by the tangential forces being transmitted.

2. A system of friction gearing comprising a drive shaft, a driven shaft in parallel relation thereto, friction wheels having beveled friction surfaces mounted thereon, a plurality of intermediate friction wheels having beveled friction surfaces for engaging friction wheels on said driving and driven shafts, said intermediate friction wheels having different diameters and face angles and being floatably mounted above and between said driving and driven friction wheels, a spindle extending through the center of said intermediate wheels, and having a spring attached to either end of said spindle, for the purpose of drawing intermediate wheels into closer contact with driving and driven wheels, so as to secure the initial contact pressure, and means for adjusting the tension of said springs.

3. A system of friction gearing comprising a drive shaft, a driven shaft in parallel relation thereto, friction wheels having beveled friction surfaces mounted thereon, and intermediate friction wheels having beveled friction surfaces for engaging friction wheels on said driving and driven shafts, said friction surfaces on intermediate wheels which engage drive wheels being of different diameter to those which engage driven wheels so as to effect a change in speed ratio between driving and driven wheels, said intermediate friction wheels being floatably mounted above and between said driving and driven friction wheels and driven in such a direction as to be drawn into closer contact with said wheels by the tangential forces being transmitted, said intermediate friction wheels having different face angles, the smaller wheels having the smaller face angle and the larger wheels having the larger face angles, so that the pressure between friction surfaces shall be in proportion to the tangential forces being transmitted, said driving and driven friction wheels having face angles appropriate to engage with said intermediate friction wheels.

HERBERT L. PROUT.